United States Patent [19]

Mochizuki

[11] Patent Number: 5,649,456

[45] Date of Patent: Jul. 22, 1997

[54] TRANSMISSION GEAR SUPPORT STRUCTURE

[75] Inventor: Akira Mochizuki, Fuji, Japan

[73] Assignee: Jatco Corporation, Fuji, Japan

[21] Appl. No.: 378,818

[22] Filed: Jan. 27, 1995

[30] Foreign Application Priority Data

Feb. 21, 1994 [JP] Japan ................................. 6-022415

[51] Int. Cl.⁶ .................................................. F16H 57/02
[52] U.S. Cl. ........................................ 74/606 R; 475/205
[58] Field of Search ............................... 74/606 R, 413; 475/205, 269, 330

[56] References Cited

U.S. PATENT DOCUMENTS

| 4,304,153 | 12/1981 | Moroto et al. ............... 475/205 X |
| 4,864,881 | 9/1989 | Beeson et al. ............... 74/606 R X |
| 5,194,056 | 3/1993 | Schifhauer ....................... 475/325 |

FOREIGN PATENT DOCUMENTS

| 3 941 299 | 7/1990 | Germany . |
| 2-48649 | 4/1990 | Japan . |

Primary Examiner—Richard M. Lorence
Assistant Examiner—Mary Ann Battista
Attorney, Agent, or Firm—Foley & Lardner

[57] ABSTRACT

A transmission gear support arrangement supports an output gear associated with a planetary gear arrangement receiving torque from an input shaft. The output gear drives and engaged gear mounted on a second shaft mounted in parallel to the input shaft. The output gear is supported on a cylindrical boss portion disposed coaxially around the input shaft, projected from an internal wall of the transmission casing. A bearing is mounted on the outer circumference of the boss portion and has an inner race between the inner side of the bearing and the outer surface of the boss portion and an outer race between the outer side of the bearing and an inner circumference of an output gear which is mounted around the boss portion. In this way the output gear may be provided closely adjacent the planetary gear and the length of the input shaft and the second shaft may be kept substantially short.

8 Claims, 4 Drawing Sheets

TRANSMISSION GEAR SUPPORT STRUCTURE

BACKGROUND OF THE INVENTION

1. Field of the Invention

The present invention relates generally to a support structure for torque transmission elements of an automotive transmission including planetary gear arrangments shift units, etc.

2. Description of the Related Art

An automotive transmission structure is known comprising a shift unit having a planetary gear arrangement situated around an shaft receiving input torque from a driving source, such as a vehicle engine, or the like. According to this structure a first output gear and a first shaft have the same rotational axis. In such a structure for a shift unit of an automotive transmission, a first torque input side and a first output gear are disposed on opposite sides of a first shaft. The reverse arrangement is also possible.

One example of such a conventional structure is disclosed in Japanese Utility Model Application first publication No. 2-48649. This application discloses a transmission gear support arrangement such as shown in FIG. 4. Referring to FIG. 4, a first input shaft 01 receives input torque from a torque converter (not shown) at one end thereof and a planetary gear arrangement (shift unit) 02 is disposed at the opposite end of the shaft 01. An output projection 03 connected to a carrier of the shift unit 02 is disposed on an outer circumferential surface of the first input shaft 01 to engage a first output (counterdrive) gear 04 which engages a first gear 06 having a rotational axis on a second shaft 05 parallel to the first input shaft 01. The first output gear is mounted via bearings 07, 09 for free rotation thereof. The first bearing 07 is mounted at an inner side of a wall portion 08 of the transmission casing disposed around the first input shaft 01, output projection 03 and the first output gear 04 etc., and the second bearing 09 is supported by a wall portion 011 projected from a pump body 010.

According to the above disclosed structure, the first output gear 04 is disposed close to the torque input end of the first input shaft 01, this arrangement is favorable for a vehicle with a laterally mounted engine since the distance of the output gear and the differential is close and the length of the second shaft 05 may be made shorter. Thus high efficiency is obtained.

However, according to such arrangement, mounting of the first output gear 04 requires a plurality of bearing portions 07, 09 to be installed which must have the same rotational axis while supported by different internal wall structures 08, 011 associated with the transmission casing and the pump body 010. Thus, complexity of assembly and a number of parts necessary is increased. Also a required accuracy of assembly is raised and costs are increased correspondingly.

Thus, it has been required to provide a simplified structure for a transmission gear support in which compactness and efficiency are maintained at lower cost with less complexity and fewer parts and which may be installed relatively easily.

SUMMARY OF THE INVENTION

It is therefore a principal object of the present invention to overcome the drawbacks of the related art.

It Is a further object of the present invention to provide a simplified structure for a transmission gear support having high efficiency and compactness.

It is a further object of the invention to provide a transmission gear support structure having substantially low cost which has fewer parts and may be installed relatively easily, and in which complexity and a necessary degree of accuracy during installation may be reduced.

In order to accomplish the aforementioned and other objects, a transmission gear support structure is provided, comprising: a first input shaft rotatably driven by torque input from a driving source; a gear shift unit disposed at an end of the first input shaft remote from a driven end thereof; an first output gear driven by an output of the gear shift unit and disposed coaxially to the first input shaft; a second gear engaging the first output gear to receive torque transmitted therefrom and mounted on a second shaft rotatably disposed in parallel to the first input shaft; support means disposed coaxially to the first input shaft and positioned between an outer circumferential surface of the first input shaft and an inner circumferential surface of an opening of the first output gear and associated with an internal wall of the transmission, the support means rotatably supporting the inner circumferential surface of the first output gear thereon.

DESCRIPTION OF THE PREFERRED EMBODIMENT

Referring to the accompanying drawings, a preferred embodiment of the invention will be described hereinbelow in detail.

Figure 1:
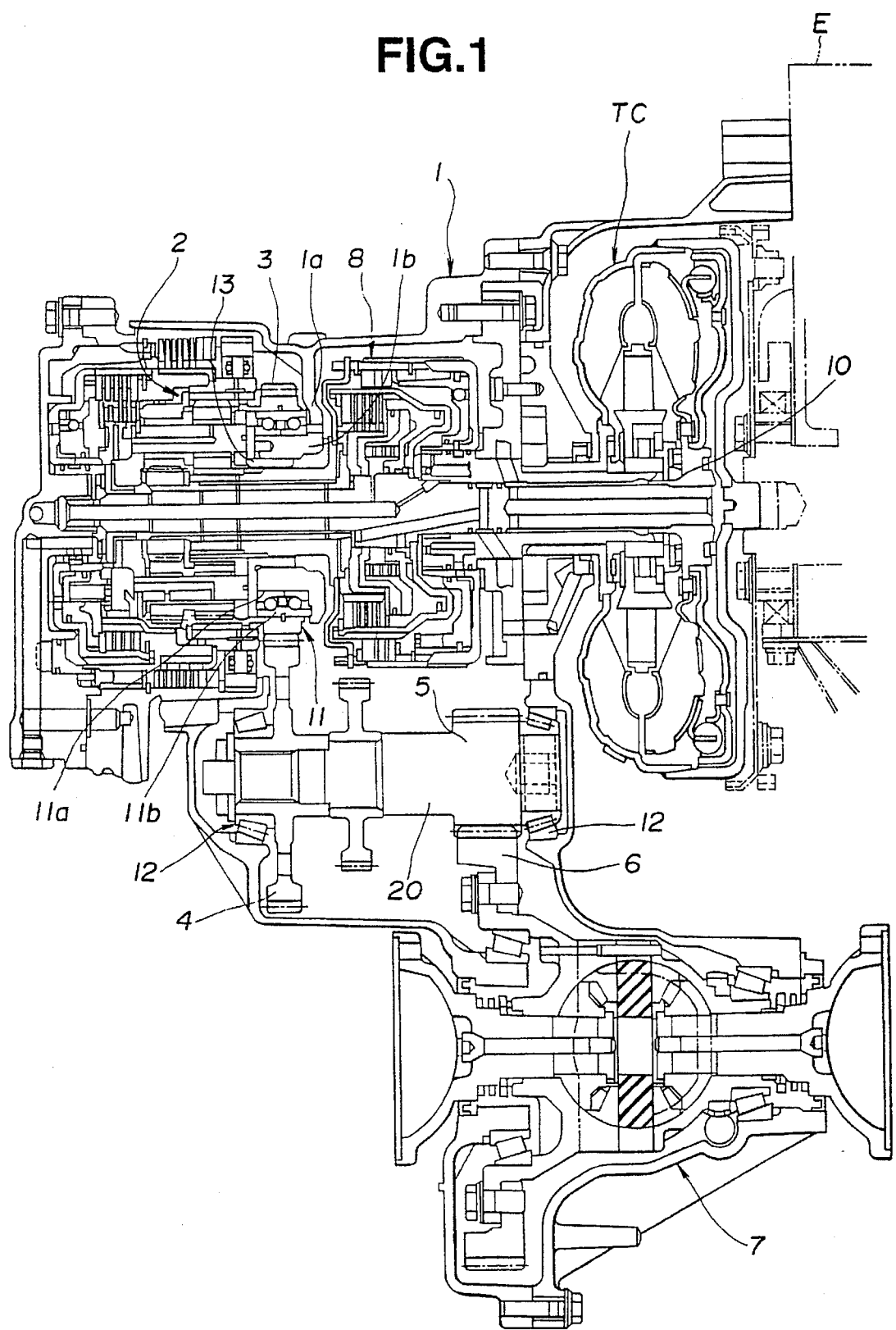
FIG. 1 is a cross-sectional view of an automotive transmission structure to which the invention is applicable.

FIG. 1, shows a cross-sectional view of gear support structure for an automatic transmission, as may be seen, within the transmission casing 1 a first input shaft 10 transmits torque between a vehicle engine E and a torque converter T/C. At an end of the input shaft 10 opposite that at which the torque converter T/C is positioned, a planetary gear arrangement, or shift unit 2 is provided. Torque is transmitted from the input shaft 10 to a first output gear 3 via the shift unit 2. The first output gear 3 engages a second gear 4 associated with a second shaft 20 arranged parallel to the first input shaft 10 such that the second shaft 20 may be turned by output torque transmitted from the first output gear 3. At another position on the second shaft 20, a second output gear S is provided. The second output gear 5 is active to transmit torque to a differential gear 7 via a final gear 6. Also included in the above described transmission structure are a plurality of clutch components 8.

Figure 3:
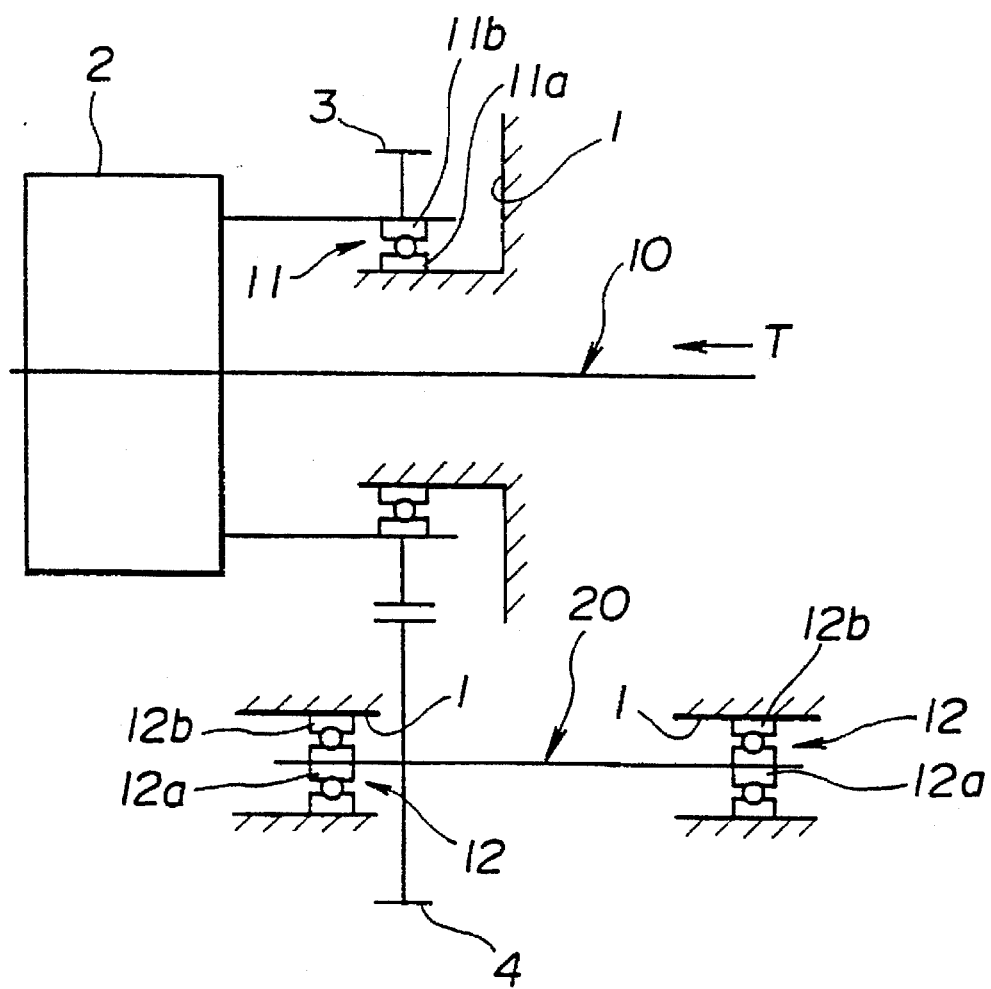
FIG. 3 is a schematic representation of torque transmission within the transmission casing.
Figure 4:
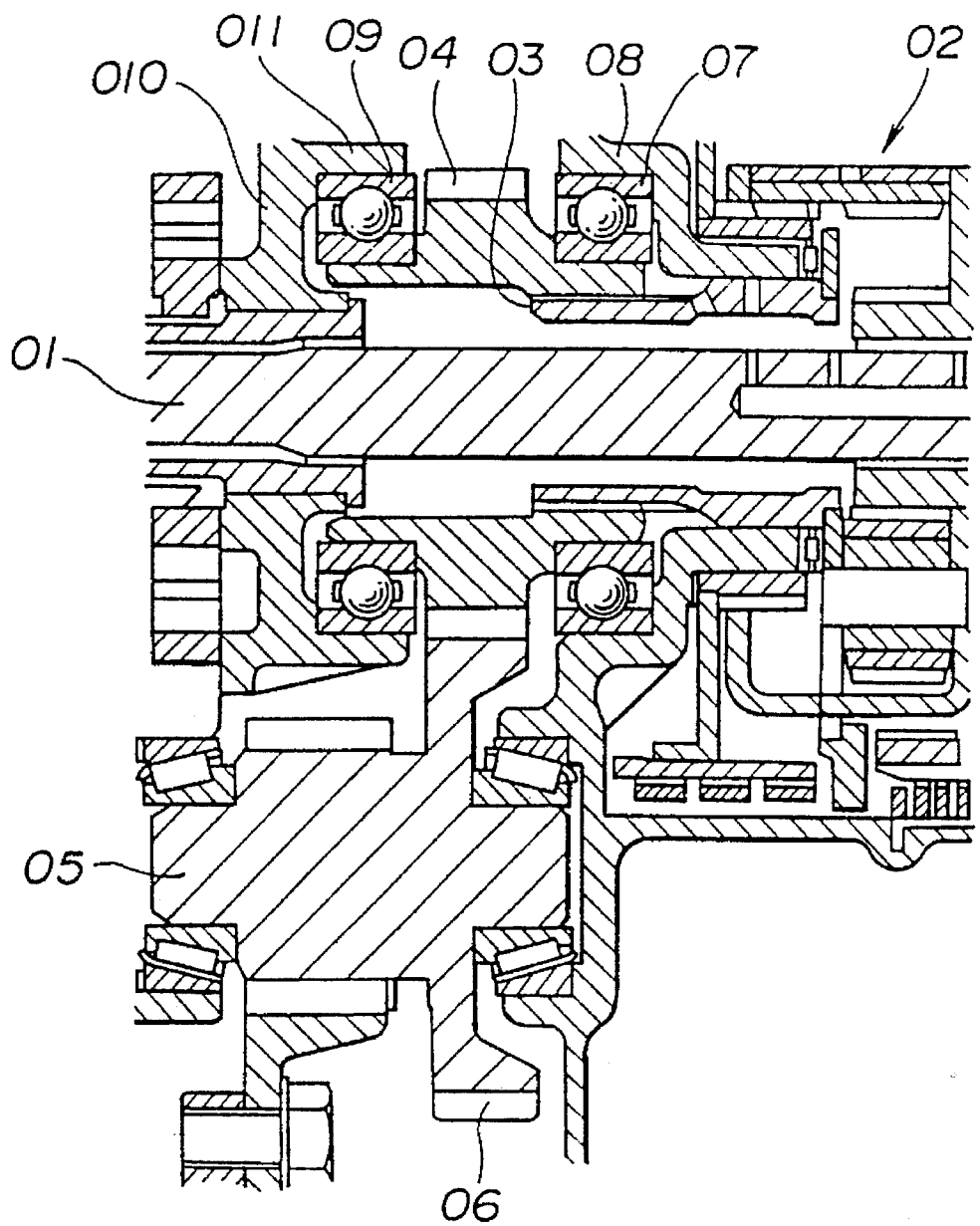
FIG. 4 is a cross-sectional view of a conventional gear support structure.

Referring now to FIG. 3, torque T from the torque converter T/C is input to the shift unit 2 via the first input shaft 10 to be output via the first output gear 3 to the second gear 4 disposed on the second shaft 20.

For allowing the above-described operation, the first output gear 3 must be mounted via a first double-row bearing 11 to allow the gear to freely rotate relative to the transmission casing 1. Further, first and second ends of the second shaft 20 must be supported on the transmission casing via a second bearing 12, 12 so as to be freely rotatable. Further, each of the bearing portions 11, 12 must be provided with an inner race 11a, 12a and an outer race 11b, 12b.

Figure 2:
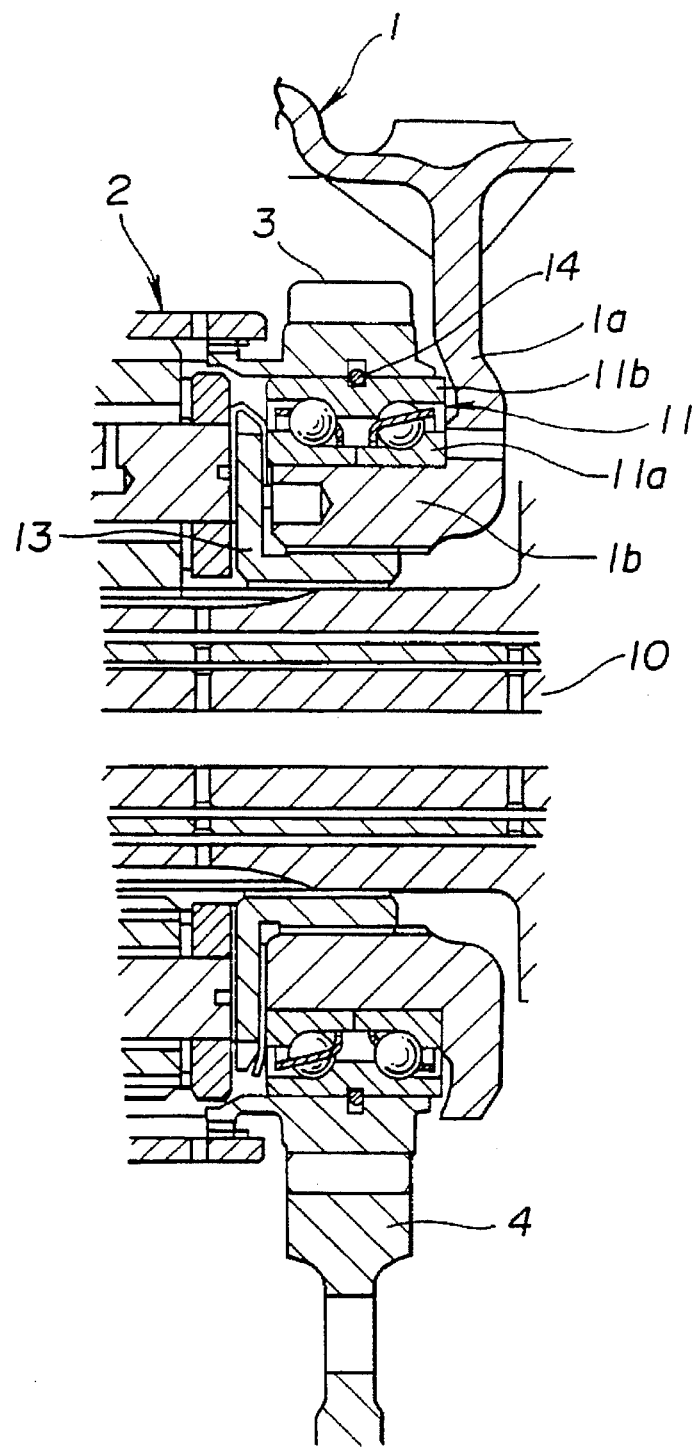
FIG. 2 is a cross-sectional view of a gear support structure of the invention shown in an enlarged view of a main portion of FIG. 1.

Referring now to FIG. 2, a support portion of the first output gear 8 will be described hereinbelow in detail.

A wall portion 1a formed integrally with the transmission casing 1 includes a boss portion 1b formed concentrically around an outer side of the first input shaft 10. At an outer side of the boss portion 1b, the inner race 11a of the bearing 11 is inset. Then, the outer race of the bearing 11 is inset on the inner circumference of the first output gear 8. The inner race 11a is fixed to the boss portion 1b by a nut 18 and the outer race 11b is fixed to the first output gear 8 by a snap ring 14.

According to the present embodiment, a support structure for the first output gear 3 as stated above wherein a first output gear 3 is arranged on an outer side of a boss portion 1b formed on an internal wall 1a integrally formed with the transmission casing 1 allows the gears 3 and 4 to mesh without obstruction and to be appropriately maintained in their respective axial positions. Further, such structure as taught above allows an axial length of the first input shaft 10 to be reduced, and space efficiency of the vehicle can be improved. In addition, since the structure for supporting the first output gear 3 is provided at a single location, a number of parts may be reduced and costs can be lowered. Further, since only one bearing 11 is mounted on the outer side of the boss portion 1b, a necessary degree of installation accuracy is reduced.

In addition, although a double line of bearings is disposed according to the above embodiment, a single line of bearings may also alternatively be used.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. In a transmission, a combination comprising:
   a shaft;
   a casing around said shaft and having a wall portion extending inwardly toward said shaft and a cylindrical boss portion concentrically around and with respect to said shaft, said cylindrical boss portion extending from said wall portion and having a cylindrical outer circumferential surface;
   an annular gear having a cylindrical inner circumferential surface opposed to said cylindrical outer circumferential surface;
   a bearing including (a) an outer race having an outer circumferential surface including a first portion and a second portion disposed on said cylindrical inner circumferential surface and a third portion between said first and second portions, (b) an inner race disposed on said cylindrical outer circumferential surface, and (c) balls operatively disposed between said outer and inner races;
   a snap ring engaging said annular gear from said cylindrical inner circumferential surface and also engaging said third portion of said outer race to fix said outer race to said annular gear; and
   means for fixing said inner race to said boss portion.

2. The combination as claimed in claim 1, wherein said annular gear has within said cylindrical inner circumferential surface means for receiving said snap ring, and said outer race includes means for receiving said snap ring.

3. The combination as claimed in claim 2, wherein said means for fixing said inner race to said boss portion includes a nut engaged with said boss portion.

4. The combination as claimed in claim 3, wherein said inner race is restrained from moving relative to said boss portion by said nut and said wall portion.

5. In a transmission, a combination comprising:
   a first input shaft;
   a casing having a wall portion extending inwardly toward said first input shaft and a cylindrical boss portion extending from said wall portion;
   a gear shift unit mounted within said casing;
   said first input shaft extending through said cylindrical boss portion and drivingly connected to said gear shift unit;
   a first output gear drivingly connected to said gear shift unit and disposed coaxially to said first input shaft;
   a second shaft disposed in parallel to said first input shaft;
   a second gear engaging said first output gear and drivingly connected to said second shaft;
   said cylindrical boss portion having a cylindrical outer circumferential surface;
   said first output gear being an annular gear having a cylindrical inner circumferential surface opposed to said cylindrical outer circumferential surface;
   a bearing including (a) an outer race having an outer circumferential surface including a first portion and a second portion disposed on said cylindrical inner circumferential surface and a third portion between said first and second portions, (b) an inner race disposed on said cylindrical outer circumferential surface, and (c) balls operatively disposed between said outer and inner races;
   a snap ring engaging said annular gear from said cylindrical inner circumferential surface and also engaging said third portion of said outer race to fix said outer race to said first output gear; and
   means for fixing said inner race to said boss portion.

6. In a transmission, a combination comprising:
   a first shaft;
   a casing having a wall portion extending inwardly toward said first shaft and a cylindrical boss portion extending from said wall portion;
   said first shaft extending through said cylindrical boss portion;
   a first annular gear drivingly connected to said first shaft and disposed coaxially to said first shaft;
   a second shaft disposed in parallel to said first shaft;
   a second gear engaging said first annular gear and drivingly connected to said second shaft;
   said cylindrical boss portion having a cylindrical outer circumferential surface;
   said first annular gear having a cylindrical inner circumferential surface opposed to said cylindrical outer circumferential surface;

a bearing including (a) an outer race having an outer circumferential surface including a first portion and a second portion disposed on said cylindrical inner circumferential surface and a third portion between said first and second portions, (b) an inner race disposed on said cylindrical outer circumferential surface, and (c) balls operatively disposed between said outer and inner races;

a snap ring engaging said annular gear from said cylindrical inner circumferential surface and also engaging said third portion of said outer race; and a nut engaged with said cylindrical boss portion in abutting engagement with said inner race.

7. The combination as claimed in claim 6, wherein said cylindrical inner circumferential surface of said first annular gear includes a first portion and a second portion and a third portion between said first and second portions thereof, said snap ring engages a groove in said third portion of said outer race and engages also a groove in said first annular gear.

8. The combination as claimed in claim 7, wherein, when said snap ring is unstressed, an inner periphery of said snap ring extends around said outer circumferential surface of said outer race.

* * * * *